Jan. 11, 1966    R. K. DURKEE ETAL    3,229,097
THERMOLUMINESCENT DOSIMETER SHIELD
Filed April 24, 1963    4 Sheets-Sheet 1

ROBIN K. DURKEE
ARTHUR C. LUCAS
*INVENTORS*

BY *Cadwallader And Kelly*

ATTORNEYS

ROBIN K. DURKEE
ARTHUR C. LUCAS
INVENTORS

BY Cadwallader and Kelly

ATTORNEYS

United States Patent Office
3,229,097
Patented Jan. 11, 1966

3,229,097
THERMOLUMINESCENT DOSIMETER SHIELD
Robin K. Durkee, Santa Barbara, and Arthur C. Lucas, Goleta, Calif., assignors to Edgerton, Germeshausen & Grier, Inc., Boston, Mass., a corporation of Massachusetts
Filed Apr. 24, 1963, Ser. No. 275,336
4 Claims. (Cl. 250—108)

This invention relates to thermoluminescent dosimeters and more particularly to shields for manganese-activated calcium fluoride thermoluminescent dosimeters to adapt them for use as personnel dosimeters.

A number of attempts have been made to apply the energy-storage properties of thermoluminescent manganese-activated calcium fluoride ($CaF_2$:Mn) to dosimetry. $CaF_2$:Mn emits light when heated after exposure to ionizing radiation. Such radiation excites the electronic structure in the crystal, freeing electrons which are able to travel in the conduction band. Some will be trapped in the metastable levels of the $CaF_2$:Mn crystal where they remain for some time. Heat releases these trapped electrons and they may lose their energy in small increments to the crystal lattice or they may emit light in which case they become fixed in the crystal at the emission center. The plot of thermoluminescent brightness versus temperature is called a "glow curve." Considerable effort has been successfully expended in the last ten years to produce thermoluminescent $CaF_2$:Mn in which low temperature peaks are reduced to a minimum and to devise means of working with the material to avoid producing such low temperature peaks during heating. Both the area under the high temperature peak (occurs at about 280° C.) and its peak amplitude are proportional to the total ionizing radiation dose. Heating to measure the dose also discharges the thermoluminescent $CaF_2$:Mn which is thereafter ready to register a new exposure as soon as it cools.

A major problem associated with high atomic number thermoluminescent materials is their energy dependence. Thus, the relative response of $CaF_2$:Mn to ionizing radiations of various energies is illustrated in FIGURE 1. Curve 20 illustrates how much greater is the response in the region of the so-called soft X-rays, than in the region of high energy gamma rays. Thin lead shields have been used but these only reduce the response to low energies. They do not make the response substantially uniform. Thin lead shields with a small hole drilled in each side have been used. This reduces response but does not smooth it adequately. Shields comprising a portion of lead, an adjacent, but not overlapping, portion of aluminum and the above small holes have been tried with some success. However, these still retain response peaks at low energies, are costly to manufacture and are difficult to reproduce accurately in production quantities. The present invention solves the foregoing problems by providing substantially uniform response and by being relatively inexpensive to manufacture in production quantities.

An object of the invention is the provision of a thermoluminescent $CaF_2$:Mn dosimeter with improved uniformity of response to a relatively wide range of high energy radiation, ranging from low X-ray energies or so-called soft rays, to high energy gamma rays or so-called hard rays.

Another object is the provision in a $CaF_2$:Mn dosimeter of shielding means capable of absorbing soft and hard rays in a manner to effect relatively greater shielding against those softer rays to which $CaF_2$:Mn is more sensitive than to the harder rays.

A further object is the provision of a shield for a $CaF_2$:Mn dosimeter, the component parts of which are easy to manufacture and are reproducible in production quantities.

Various other objects and advantages of the invention will become apparent from a perusal of the following specification and the drawings accompanying the same. In the drawings.

Figure 1:
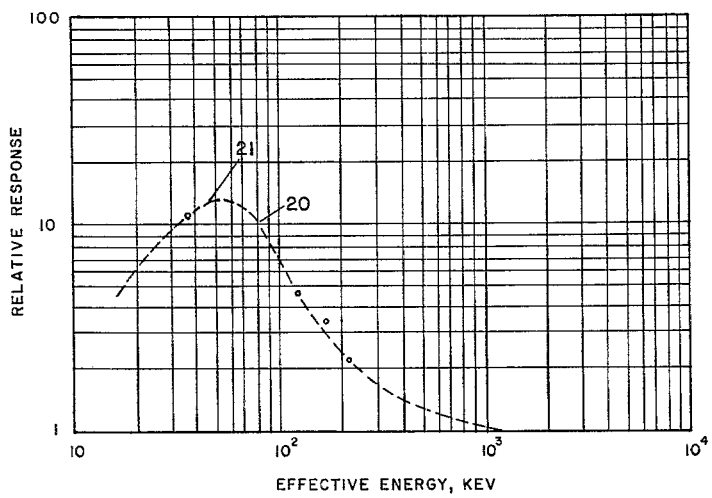
FIGURE 1 illustrates graphically the relative response of $CaF_2$:Mn to ionizing radiations of various energies.

Referring again to FIGURE 1, curve 20 illustrates the relative response of $CaF_2$:Mn to ionizing radiations of various energies. The peak 21 must be flattened out and the whole response made relatively uniform over the range of energies of radiations to which a $CaF_2$:Mn dosimeter is subjected, if the light emitted by the dosimeter during heating is to indicate with accuracy the integrated exposure.

Figure 2:
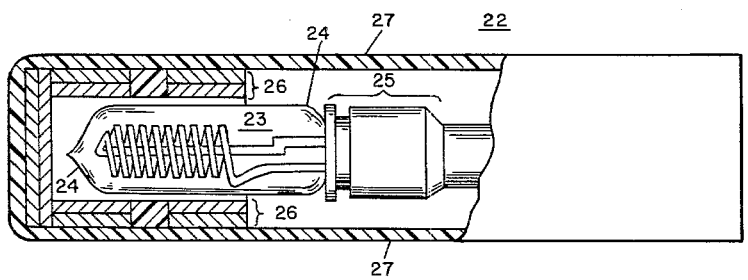
FIGURE 2 is a side view partially cut away and partially in section of a thermoluminescent $CaF_2$:Mn dosimeter containing the shield of the present invention.

FIGURE 2 illustrates some of the parts of a typical production model thermoluminescent dosimeter 22. Dosimeter 22 comprises $CaF_2$:Mn detector element 23, glass envelope 24, base 25, shield 26 and plastic cover 27. Detector element 23 comprises an electric heater coil of Nichrome wire coated with 1:1 mixture of aqueous potassium silicate and powdered thermoluminescent $CaF_2$:Mn that has hardened at room temperature to a translucent, hard adhering mass. Glass envelope 24 encompasses detector element 23 and may be evacuated or filled at atmospheric pressure with a gas that has a low thermal conductivity, that will not luminesce when heated, and that is inert. Argon meets these requirements. It must have low thermal conductivity so the heater coil may be heated rapidly without losing too much heat. It must not luminesce when heated otherwise erroneous readings of exposure would be obtained. It must be inert and not react with the thermoluminescent $CaF_2$:Mn, destroying its sensitivity to ionizing radiations. Base 25 contains electrical contacts (not shown) for heating current. Plastic cover 27 is preferably opaque to light but not to ionizing radiations. The construction of shield 26 will be described in detail hereinafter. Other parts of dosimeter 22 are not shown because they do not contribute to the present invention.

Figure 3:
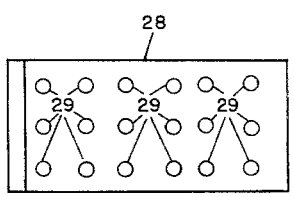
FIGURE 3 is a side view of a thin lead shield containing a plurality of holes.
Figure 4:
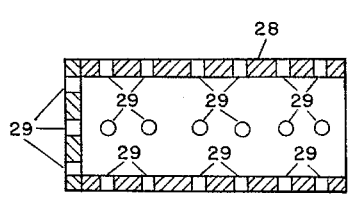
FIGURE 4 is a sectional view of the shield of FIGURE 3.
Figure 5:
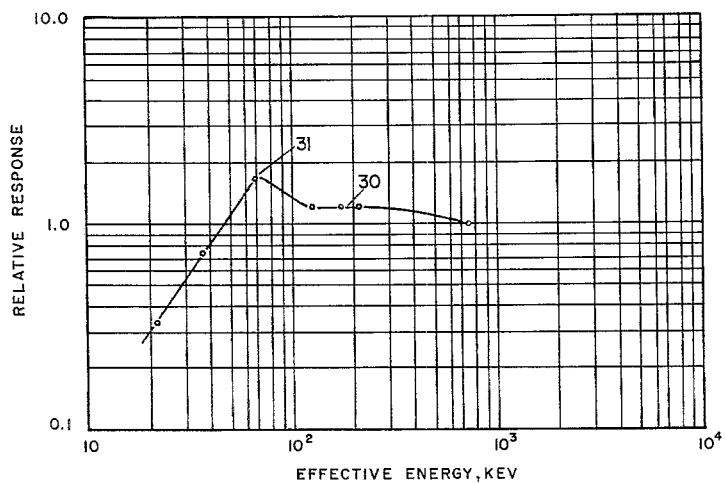
FIGURE 5 illustrates graphically the relative response of a $CaF_2$:Mn dosimeter utilizing the shield of FIGURES 3 and 4.

FIGURES 3 and 4 illustrate lead shield 28, 0.66 mm. thick, through which a plurality of holes 29 have been drilled. The sum of the cross-sectional areas of holes 29 equals approximately 10% of the area of thermoluminescent $CaF_2$:Mn subject to impingement by ionizing radiations. Curve 30 of FIGURE 5 illustrates that lead shield 28 was not quite thick enough to attenuate low-energy peak 31. However, increasing the thickness of lead shield 28 would not solve the problem because this would produce an undesirable minimum response (not shown) at 120 kev.

Figure 6:
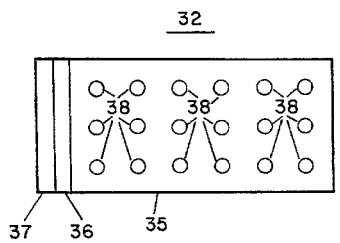
FIGURES 6 and 7 illustrate a side view and a sectional view of a lead-tin shield with holes.
Figure 7:
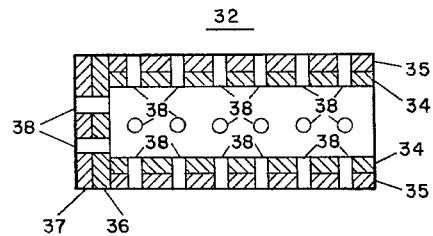
Figure 8:
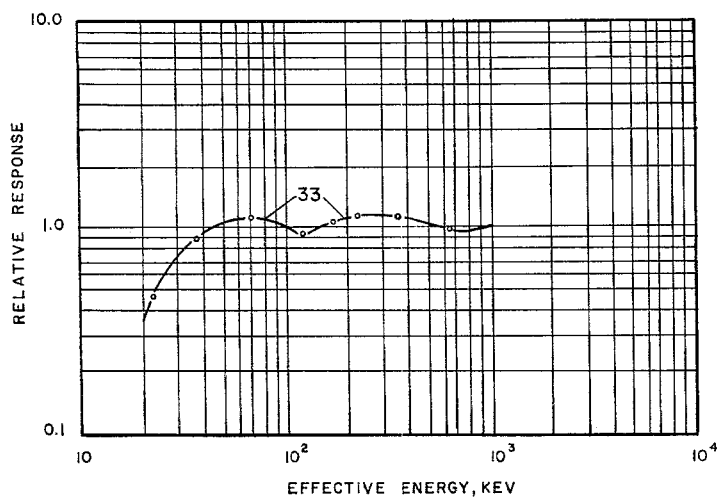
FIGURE 8 illustrates graphically the relative response of the shield of FIGURES 6 and 7.

Shield 32 of FIGURES 6 and 7 produces a much better relative response as illustrated by curve 33 of FIGURE 8.

Shield 32 comprises thin lead cylinder 34 with its outer cylindrical surface in surface-to-surface contact with the inner cylindrical surface of thin tin cylinder 35 and thin lead end cap 36 with its outer surfacce in surface-to-surface contact with the inner surface of thin tin end cap 37. End caps 36 and 37 may be permanently sealed together and permanently fastened to cylinders 34 and 35 if desired. Again, a plurality of holes 38 are drilled through said cylinder and end caps as illustrated, leaving approximately 10% of the area of $CaF_2$:Mn on detector 23 (see FIGURE 2) substantially unshielded. With a 0.66 mm. thick layer of lead and a 0.86 mm. thickness of tin, response curve 33 of FIGURE 8 was obtained. Curve 33 indicates that shield 32 is satisfactory from the viewpoint of energy dependence. Its relative response has been substantially flattened in the 35-400 kev. energy range. However, holes 38 were drilled in a definite pattern. Those skilled in the mechanical arts will appreciate the difficulties and costs involved in drilling holes 38 in cylinders 34 and 35 and end caps 36 and 37 and then assembling the parts to get the 10% unshielded detector area desired.

Figure 9:
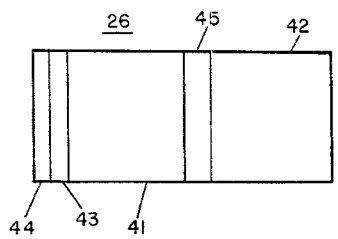
FIGURES 9 and 10 illustrate a preferred embodiment of the lead-tin shield of the present invention.
Figure 10:
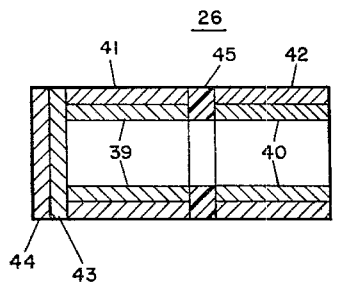

These problems are avoided by using shield 26 illustrated in FIGURE 2 and in detail in FIGURES 9 and 10. Shield 26 comprises thin lead cylinders 39 and 40, contacting thin tin cylinders 41 and 42 respectively, thin lead end cap 43, thin tin end cap 44, and cylindrical plastic spacer 45, all assembled as illustrated in FIGURE 10. Cylindrical plastic spacer 45 is made of a plastic material that does not attenuate ionizing radiations. Its cylindrical area is such that approximately 10% of the area of $CaF_2$:Mn is unshielded. There are no holes drilled in cylinders 39, 40, 41 and 42, nor in end caps 43 and 44. This greatly simplifies manufacturing operations since the foregoing cylinders, end caps, and spacer can be inexpensively made with sufficient accuracy to provide the 10% unshielding desired.

Figure 11:
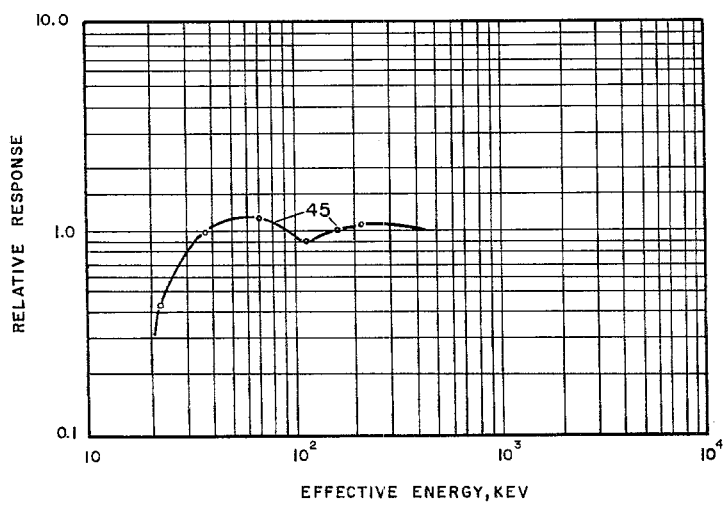
FIGURE 11 illustrates graphically the relative response of the shield of FIGURES 9 and 10.

Curve 45 of FIGURE 11 illustrates the response of dosimeter 22 to shield 26. Note that curve 45 is substantially similar in shape to curve 33 of FIGURE 8. This indicates that shield 26 is satisfactory not only from the viewpoint of ease and cost of manufacture, but also from the viewpoint of energy dependence.

It will be appreciated that we have provided a thermoluminescent $CaF_2$:Mn dosimeter with improved uniformity of response over a relatively wide range of high energy radiations ranging from low X-ray energies to higher energy radiations such as gamma rays. This has been accomplished by providing shielding means capable of absorbing soft and hard rays in a manner that attenuates to a greater degree the soft rays to which $CaF_2$:Mn is more sensitive. Moreover, such shielding means is simple and inexpensive to manufacture in production quantities.

It will be understood that various changes in the details, materials and arrangements of parts which have been herein described and illustrated in order to explain the nature of the invention, may be made by those skilled in the art within the principle and scope of the invention as expressed in the appended claims.

We claim:
1. A thermoluminescent dosimeter comprising:
a glass envelope;
a radiation detector mounted within said envelope comprising thermoluminescent manganese-activated calcium fluoride;
a radiation shield encompassing said envelope except for the base thereof, said shield comprising a thin layer of lead disposed exteriorly of and in close proximity to said envelope and a layer of tin disposed exteriorly of and in contact with said layer of lead, said layers of tin and lead having common voids to permit ionizing radiation to impinge without attenuation upon approximately 10% of the exterior surface area of said thermoluminescent manganese-activated calcium fluoride.

2. A thermoluminescent dosimeter as in claim 1 in which
said radiation detector further comprises a coil of Nichrome heater wire coated with thermoluminescent manganese-activated calcium fluoride; and
said voids in said shield comprise a regular pattern of holes drilled through said layers of tin and lead with the total cross-sectional area of said holes being approximately equal to 10% of the exterior surface area of said thermoluminescent manganese-activated calcium fluoride.

3. A thermoluminescent dosimeter as in claim 1 in which
said radiation detector further comprises a coil of Nichrome heater wire coated with thermoluminescent manganese-activated calcium fluoride; and
said shield comprises:
a first combination of a thin lead cylinder having a thin tin cylinder disposed exteriorly of and in contact therewith, with a thin circular lead cap covering one end thereof, said lead cap having a circular tin cap disposed exteriorly of and in contact with said lead cap;
a second combination of a thin lead cylinder having a thin tin cylinder disposed exteriorly of and in contact therewith; and
a plastic cylindrical spacer disposed between open ends of said first combination of lead and tin cylinders and said second combination of lead and tin cylinders, said spacer having sufficient exterior cylindrical surface area to permit ionizing radiation to impinge without attenuation upon approximately 10% of the exterior surface area of said thermoluminescent manganese-activated calcium fluoride.

4. A thermoluminescent dosimeter as in claim 3 in which:
the wall thickness of said lead cylinders and said lead cap is approximately 0.66 millimeter; and
the wall thickness of said tin cylinders and said tin cap is approximately 0.86 millimeter.

References Cited by the Examiner
UNITED STATES PATENTS

| | | | |
|---|---|---|---|
| 2,578,722 | 12/1951 | McCartney et al. | 250—108 X |
| 2,752,505 | 6/1956 | Klick | 250—83 |
| 2,775,710 | 12/1956 | Ludeman | 250—71 |
| 3,115,578 | 12/1963 | Schulman | 250—71 |

FOREIGN PATENTS 1,072,470  12/1959  Germany.

RALPH G. NILSON, *Primary Examiner.*

ARCHIE R. BORCHELT, *Assistant Examiner.*